Feb. 26, 1963 W. H. TRAMMELL, JR., ET AL 3,078,516
APPARATUS FOR FORMING AUTOMOBILE FLOOR MATS
Filed Jan. 13, 1959 5 Sheets-Sheet 2

INVENTORS
WILLIAM H. TRAMMELL, JR.,
CLIFFORD N. WALLACE, JR. &
WILLIAM B. HEYWARD
BY Parrott & Richards
ATTORNEYS Feb. 26, 1963 W. H. TRAMMELL, JR., ET AL 3,078,516
APPARATUS FOR FORMING AUTOMOBILE FLOOR MATS
Filed Jan. 13, 1959 5 Sheets-Sheet 3

INVENTORS
WILLIAM H. TRAMMELL, JR.
CLIFFORD N. WALLACE, JR.
& WILLIAM B. HEYWARD
BY Parrott & Richards
ATTORNEYS Feb. 26, 1963   W. H. TRAMMELL, JR., ET AL   3,078,516
APPARATUS FOR FORMING AUTOMOBILE FLOOR MATS
Filed Jan. 13, 1959   5 Sheets-Sheet 4
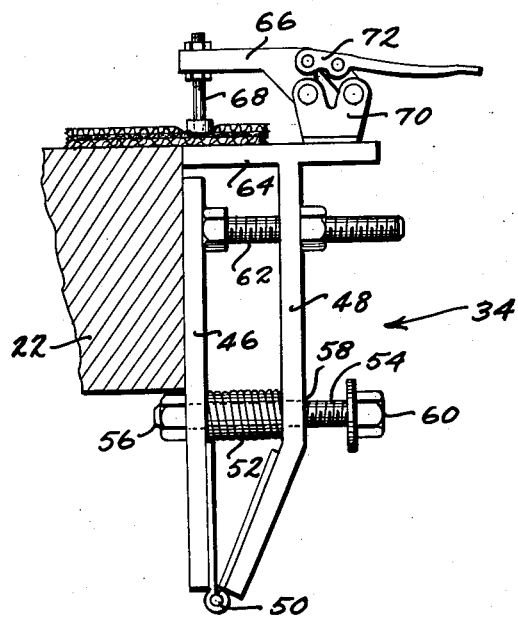
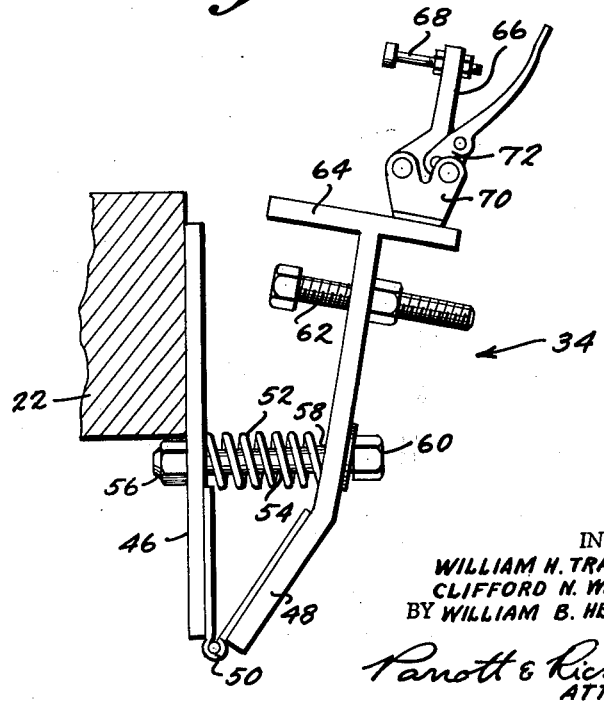
INVENTORS
WILLIAM H. TRAMMELL, JR.,
CLIFFORD N. WALLACE, JR. &
BY WILLIAM B. HEYWARD
Parrott & Richards
ATTORNEYS Feb. 26, 1963 W. H. TRAMMELL, JR., ET AL 3,078,516
APPARATUS FOR FORMING AUTOMOBILE FLOOR MATS
Filed Jan. 13, 1959 5 Sheets-Sheet 5
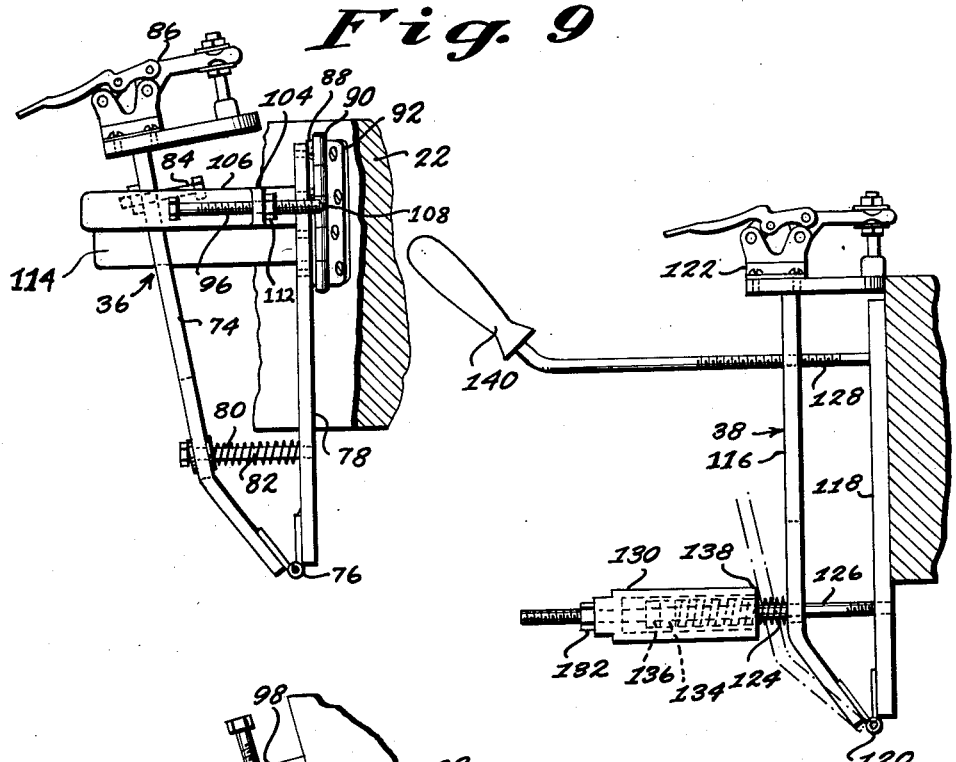
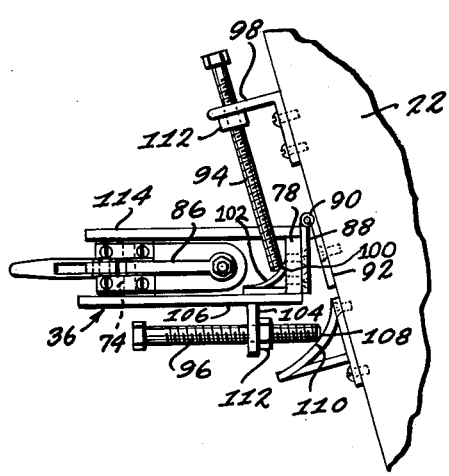
INVENTORS
WILLIAM H. TRAMMELL, JR.,
CLIFFORD N. WALLACE, JR. &
BY WILLIAM B. HEYWARD
Parrott & Richards
ATTORNEYS

United States Patent Office 3,078,516
Patented Feb. 26, 1963

3,078,516
APPARATUS FOR FORMING AUTOMOBILE
FLOOR MATS
William H. Trammell, Jr., Piedmont, and Clifford N. Wallace, Jr., and William B. Heyward, Greenville, S.C., assignors to J. P. Stevens & Co., Inc.
Filed Jan. 13, 1959, Ser. No. 786,617
8 Claims. (Cl. 18—19)

This invention relates to apparatus for forming floor mats for automobiles and more particularly to apparatus for forming a contoured, two-ply, fabric mat wherein the plies are laminated together and pressed into the desired shape in a single operation.

An automobile mat of the type that may be produced by the apparatus of the present invention, is described and claimed in copending application Serial No. 786,600, filed January 13, 1959, now abandoned.

In producing a contoured, laminated fabric mat in accordance with the present invention, a continuous sheet of matting, such as jute, which forms a cushion or pad in the final product, is impregnated with a rigidifying resin, such as a styrene-butadiene composition. A continuous sheet of carpeting, including a backing material, such as burlap, is impregnated with an adhesive resin, such as polyvinyl acetate to lock the pile tufts in the backing and subsequently to bond the matting and carpet together during lamination. Following impregnation of the matting and carpet, they are brought into alignment and passed between press rolls to form a preliminary lamination, which is cut in predetermined lengths for laminating and shaping in a molding press.

Suitable apparatus for carrying out the impregnating, laminating and molding steps are illustrated in the accompanying drawings, in which:

FIG. 7 is an enlarged side elevational view of the simple pull clamp secured at the center of the front of the press with a length of carpeting material clamped therein and the clamp drawn against the press;

FIG. 8 is a view similar to FIG. 7 showing the clamp in the open position;

FIG. 9 is a side elevational view of one of the compound pull clamps secured to the press and shown in the open position;

FIG. 10 is a top plan view of the compound pull clamp of FIG. 9; and

FIG. 11 is a side elevational view of one of the push clamps secured to the rear of the press and shown in the open position.

Figure 1:
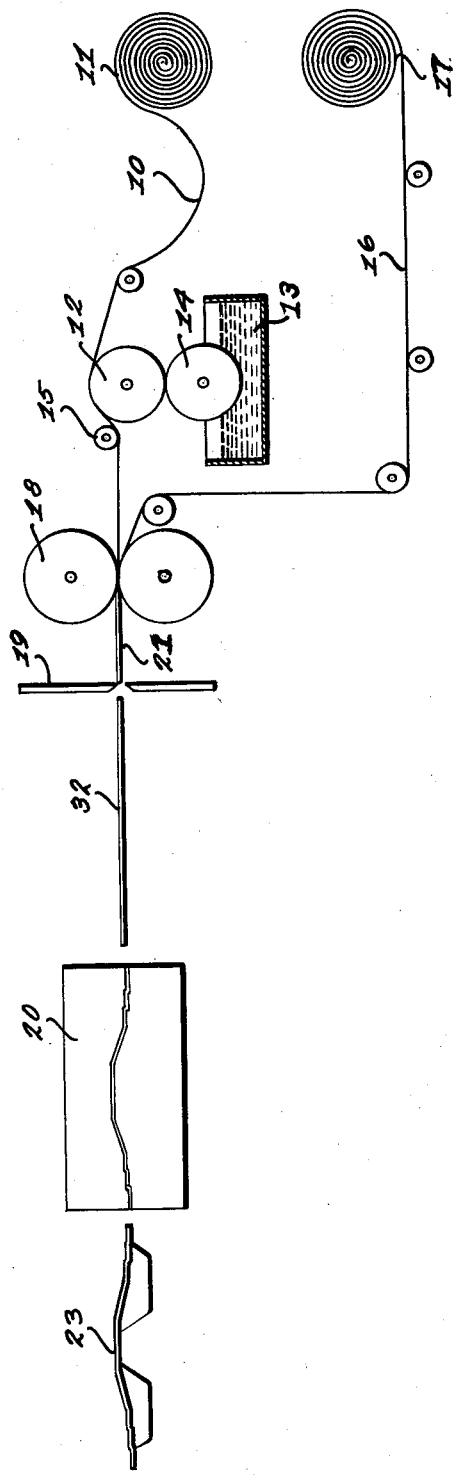
FIG. 1 is a schematic diagram of the impregnating, laminating and molding steps of the preferred embodiment of the present invention.
Figure 2:
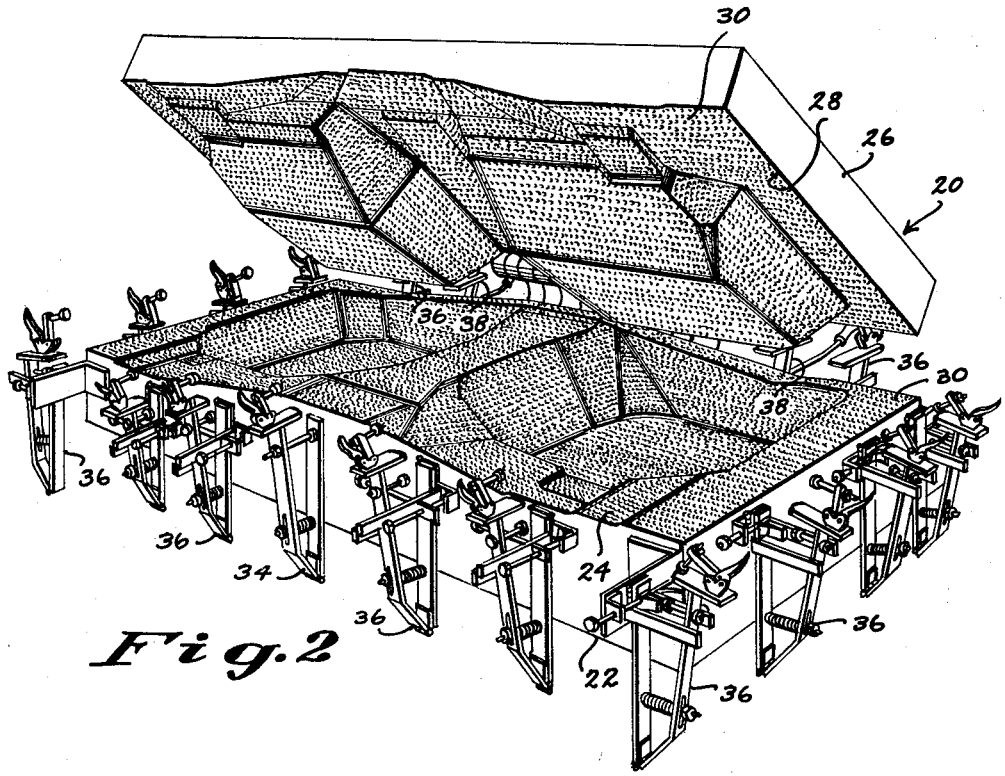
FIG. 2 is a perspective view of the press in the open position prior to insertion of a length of carpeting material.
Figure 3:
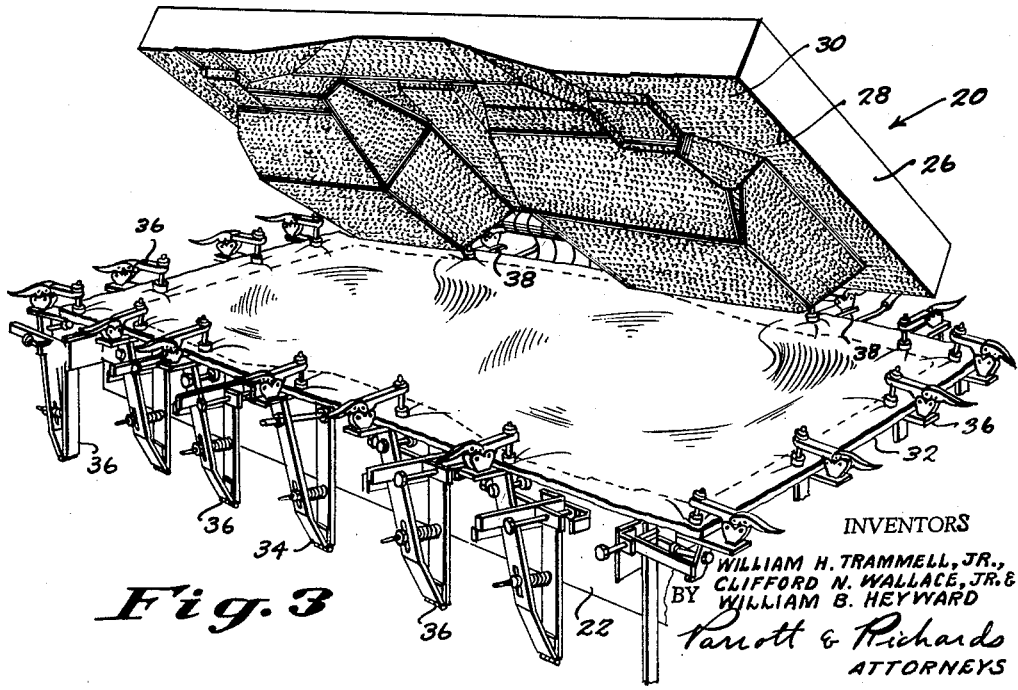
FIG. 3 is a perspective view of the press in the open position with a length of carpeting material positioned in the clamps prior to closing the press.
Figure 4:
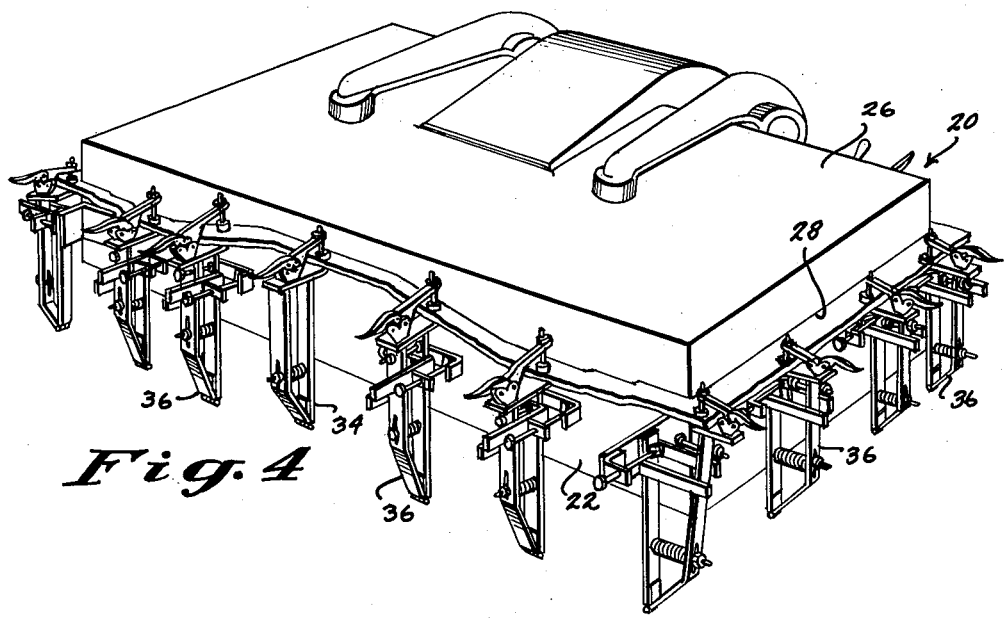
FIG. 4 is a perspective view of the press in the closed position with a length of carpeting material being laminated and shaped therein.
Figure 5:
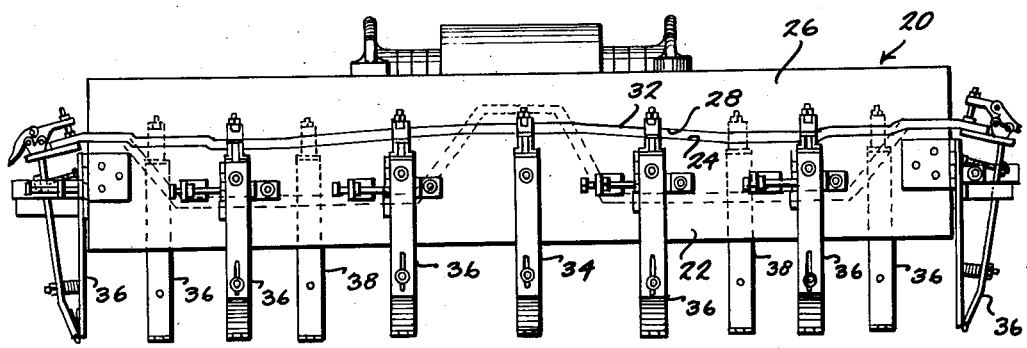
FIG. 5 is a front elevational view of the press of FIG. 4.
Figure 6:
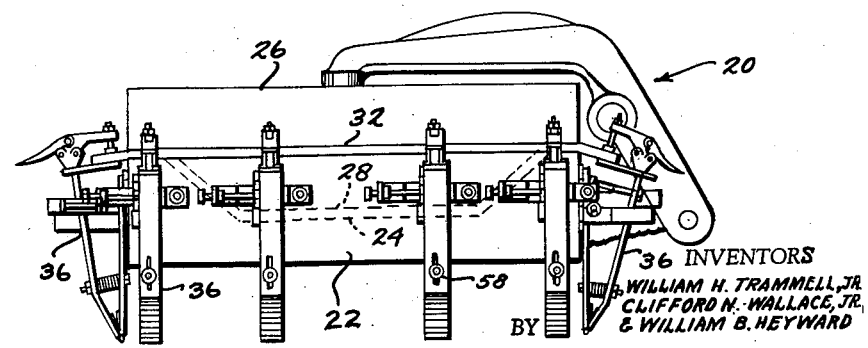
FIG. 6 is a side elevational view of the press of FIG. 4.

A continuous sheet of carpeting 10 feeds from a supply roll 11 over a suitable guide roller to an impregnating roller 12 which applies polyvinyl acetate to the underside of the carpeting 10. A supply of polyvinyl acetate is contained in a bath 13 and is transferred to the coating roller 12 by a partially submerged roller 14 which is in contact with the impregnating roller 12. A pressure roller 15 is positioned adjacent the impregnating roller 12 and maintains the carpeting 10 in contact with the impregnating roller 12 to insure uniform transfer of the polyvinyl acetate to the carpeting 10.

A continuous sheet of matting 16, which has been treated with a styrene-butadiene composition and stored or shipped in rolls 17, is guided by suitable rollers into alignment with the carpeting 10 with the resin impregnated underside of the carpeting in contact with the matting. The aligned carpeting 10 and matting 16 pass through pressure rolls 18 which press the carpeting and matting plies together to form a preliminary lamination 21 bonded together by the adhesive polyvinyl acetate resin. This preliminary lamination 21 then passes between cutter blades 19 which cut the continuous lamination into predetermined lengths 32 for subsequent molding in the press 20 to form the contoured, two-ply, laminated mat 23.

The press 20 consists of a buck or base 22 having a contoured face 24 and a movable head 26 having a contoured face 28 shaped to mate with the face of the buck 22. The particular contour of the molding faces 24 and 28 may be varied depending upon the use of the carpet, and the scope of this invention is not to be limited to the particular contour illustrated in the drawings. The particular contour illustrated produces the shaped carpet illustrated in the above referred to copending application Serial No. 786,600, filed January 13, 1959, now abandoned. The contoured faces 24 and 28 are perforated as at 30 to permit the introduction of steam and the evacuation of air and moisture from the mold space. Means for introducing steam and for creating a vacuum are incorporated in the press 20 but are not illustrated in detail as they may be of any conventional construction familiar to the art of molding.

The length of two-ply mat material 32 is held in the press before and during molding by clamps 34, 36 and 38 mounted around the edges of the press 20. One of these clamps is a simple tension or pull clamp 34 located at the center of the front edge 40 of the buck 22. Compound tension or pull clamps 36 are located along the front edge 40 of the press on both sides of the simple pull clamp 34, along the side edges 42 and at the rear edge 44 adjacent the corners of the buck 22. The tensioning or pull clamps 34 and 36 tension the length of mat material 32 across the press so as to stretch the length and prevent wrinkling when the mold is closed.

The push clamps 38, of which there are two in the illustrated embodiment, are located at the rear edge 44 of the buck 22 inwardly of the compound pull clamps 36. These push clamps 38 are clamped to the length of mat material 32 and urge it inwardly so as to sag into the deep wells of the mold face 24 of the buck 22. This positions sufficient material in the deep wells so that as the head is closed the laminated length will assume the contour of the mold faces without bursting. The clam-like action of the head 26, closing from rear to front, makes it especially important to have sufficient material at the rear. However, it is to be understood that the scope of the present invention is not to be limited to the use of push clamps as they may be eliminated in some embodiments. For example, a press having a shallow mold contour would not require additional sagging for satisfactory molding.

The simple center pull clamp 34 illustrated in FIGS. 7 and 8. It comprises a vertical stationary arm 46 secured to the buck 22 and a swinging arm 48 pivotally attached to the vertical stationary arm 46 by a hinge 50 connecting the lower ends of the arms 46 and 48. The swinging arm 48 is normally urged outwardly away from the vertical stationary arm 46 by means of a coil spring 52 interposed between the arms and mounted around a bolt 54 which has one end 56 secured to the vertical stationary arm 46. The bolt 54 extends through a slot 58 in the swinging arm 48 and the bolt head 60 serves as an outer stop against which the swinging arm 48 is normally urged by the spring 52. The bolt 54 is threadably adjustable in the stationary arm 46 so that the outward movement of the swinging arm 48, limited by the bolt head 60, may be adjusted as desired. The inward movement of the swinging arm 48 is limited by a finger 62 extending inwardly from the swinging arm and positioned to strike the vertical stationary arm 46. This finger 62 may take the form of a bolt threadably adjustable in the swinging arm 48.

A horizontal clamping plate 64 is secured to the top of the swinging arm 48 and has a clamping arm 66 attached thereabove. This clamping arm 66 has a clamping finger 68 adjustably threaded in one end thereof and its other end pivotally attached in a bracket 70. The clamping arm 66 is locked with its clamping finger 68 against the clamping plate 64 by means of a toggle lock 72 mounted on the bracket 70.

The compound tension or pull clamps 36 are similar to the center clamp 34 in many respects. Thus each compound clamp 36 has a swinging arm 74 connected by a hinge 76 to a vertical arm 78, with the swinging arm 74 being urged outwardly by a spring 80 mounted on an adjustable stop bolt 82 which limits outward movement of the swinging arm 74. Similarly, a limit finger 84 extends inwardly from the swinging arm to limit its inward movement. A clamping mechanism 86 having the identical clamping elements of the center clamp 34 is attached to the top of the swinging member 74.

In addition to the above, the compound pull clamps 34 are angularly adjustable in a horizontal plane so that they can tension the length of mat material 32 at oblique angles as desired to prevent wrinkling during molding. This is accomplished by attaching the vertical arm 78 of each clamp to one plate 88 of a vertical hinge 90 with the other hinge plate 92 secured to the buck 22. The clamps are adjusted to a desired angle and locked in place by a pair of locking bolts 94 and 96. The first locking bolt 94 is adjustably mounted on an angle bracket 98 attached to the side of the buck 22 so that the bolt 94 extends parallel with the side of the buck. The tapered end 100 of the bolt 94 seats against the curved surface of a bracket 102 secured to the vertical arm 78 to limit swinging of the clamp 36 away from the press. The other adjusting and locking bolt 96 is attached to a bracket 104 on a horizontal guide bar 106 which extends horizontally from the vertical arm 78. The tapered end 108 of this bolt seats against the curved surface of a bracket 110 secured to the side of the buck to limit the inward swing of the compound clamp 36. Thus the bolts 94 and 96 combine to lock the compound clamp 36 in any desired angular position. The surfaces of both the brackets 102 and 110 are curved so that the tapered ends 100 and 108 of the bolts 94 and 96 will seat squarely on the curved surfaces at any adjusted position of the clamp. Both bolts 94 and 96 are locked in place by jamb nuts 112 so that once the compound clamp 36 is positioned it cannot be moved until the jamb nuts 112 are backed off.

The guide bar 106 mentioned above and a lower guide bar 114 extend horizontally outwardly from the sides of the vertical arm 78 and are spaced from each other a distance slightly greater than the width of the swinging arm 74 so as to guide the movement of the swinging arm. The lower guide bar 114 nearest the bolt 94 on the press is positioned below the first guide bar 106 so that it will not interfere with the bolt 94, which must extend past the bar 106 to seat on the curved surface of the bracket 102. This lower bar 114 is slightly shorter than the higher bar 106 so that the ends of both bars will coincide with the inclination of the swinging arm 74 at its outermost position.

The pair of push clamps 38 located at the rear edge 44 of the buck 22 are similar to the simple center clamp 34, having identical swinging arms 116 attached to vertical stationary arms 118 by hinges 120 and having identical clamping mechanisms 122 attached to the top of the swinging arms 116. They also have springs 124 and bolts 126 at the bottom and limit fingers 128 at the top. However, these springs 124, bolts 126 and fingers 128 are not similar to the corresponding elements of the center pull clamp 34. The bolts 126 are threadably attached to the stationary arms 118 and extend outwardly through the swinging arms 116. Hollow cylinders 130 are mounted on extensions of the bolts 126 and are locked thereon by jamb nuts 132. The springs 124 are biased between the swinging arms 116 and adjustable nuts 134 on the bolts 126, and the adjustable nuts 134 are locked in place by jamb nuts 136. The hollow cylinders 130 extend inwardly beyond the adjustable nuts 134, and serve as guides for the springs 124. The inner ends 138 of the cylinders 130 serve as stops to limit the outward movement of the swinging arms 116 and may be adjusted by relocating the cylinders without changing the bias of the spring.

The limit fingers 128 are threaded adjustably in the swinging arms 116 and extend inwardly to limit the inward movement of the swinging arms. They also extend outwardly and have handles 140 which may be grasped to pull the swinging arms 116 outwardly prior to clamping the length of mat material 32 so that the clamping mechanism 122 can nip the outer edge of the length and push it inwardly to sag into the deep well mold faces.

When a cut length of mat material 32 is placed across the buck 22 of the press 20 with its edges clamped in the center pull clamp 34, the compound pull clamps 36 and the push clamps 38, the limit fingers 70, 81 and 101 of all the clamps 56, 58, and 61 are adjusted to limit the inward movement of the clamps so that the length will be properly positioned throughout the operation of the press.

Prior to closing the press 20, the mold faces 24 and 28 are heated in any conventional manner and steam is introduced through the buck 22 to soften the mat material and make it more pliable, thus facilitating the shaping by the mold faces and reducing the required tensioning of the pull clamps 34 and 36. Also, the water vapor created by the steaming increases heat transfer to the mat, reducing the time necessary to complete the molding operation. In one embodiment of the press the mold faces 24 and 28 are heated to a temperature of 312° F. and the presteaming is applied for a period of approximately 12 seconds.

The head 26 of the press is pivoted from the rear into the buck 22, pressing the mat to conform to the contour of the mold faces 24 and 28. When the press is closed, steam is again introduced for a period of approximately 12 seconds to further soften the mat and insure its retaining the contour of the mold faces. A vacuum is then created in the buck 22 to draw steam downwardly from the mat, and steam is introduced through the head 26 for a period of approximately 12 seconds. This forces the adhesive resin of the carpet layer downwardly to insure that none of it will mar the surface of the finished carpet. The introduction of steam is then ceased and the vacuum is continued for 20 seconds to remove moisture and thereby dry and harden the mat. The press then remains closed for an additional 30 seconds and finally the head is raised and a vacuum is again created to pull out any remaining moisture.

This mold operation provides a multi-function "one-shot" step which presses, laminates and molds the carpet in one action, greatly reducing cost and production time and making the overall process commercially competitive with existing automobile carpet manufacturing and installation.

After the laminated and shaped mat is removed from the press it may be subjected to various finishing operations, as desired. For example, it may be placed in a trimming jig in which the edges are trimmed to remove the mold "flash" and to prepare the edges for attachment of sill extensions.

When sill extensions are required, they may be formed integrally during the laminating and shaping in the press 20 and they may be of any desired shape and form depending upon the end use of the carpet. However, they are normally flat and thus can be laminated in a simple press independent of the molding press 20. This independent lamination conserves material since, if formed integrally, a considerable amount of material normally has to be cut away to provide the final sill extension configuration. The independent sill extensions can be attached simply by using pressure sensitive tape or by sewing.

The method and apparatus described above is particularly suited for forming mats which are to be used on the rear floor of automobiles which have deep well portions. Generally speaking, the same apparatus and method could be used for making similarly shaped mats for the front to accommodate the somewhat shallower wells in the front floor.

While this invention is susceptible of embodiments in many different forms, there is shown in the drawings and has herein been described in detail one specific embodiment, with the understanding that the present disclosure is to be considered as an exemplification of the principles of the invention and is not intended to limit the invention to the embodiment illustrated. The scope of the invention will be pointed out in the appended claims.

We claim:

1. An apparatus for shaping a fabric comprising a press having opposing contoured mold faces, movable clamping members attached to said press for clamping the edges of a fabric in the press, outwardly directed resilient means normally urging some of the clamping members away from said press and thereby yieldably tensioning the fabric across the mold faces, inwardly directed resilient means normally urging other clamping members toward the press and thereby urging the adjacent portions of the fabric inwardly to sag into the contour of the mold faces, and means for closing said press to force the mold faces together with the tensioned fabric therebetween, thereby shaping the fabric to the contour of the mold faces.

2. An apparatus for shaping a fabric comprising a press having opposing contoured mold faces, clamping members hingedly attached to said press for clamping the edges of a fabric in the press, outwardly directed resilient means normally urging some of the clamping members away from said press and thereby tensioning the fabric across the mold faces, inwardly directed resilient means normally urging other clamping members toward the press and thereby urging the adjacent portions of the fabric inwardly to sag into the contour of the mold faces, said inwardly directed resilient means comprising arms secured to the press and extending outwardly through and beyond said other clamping members and coil springs mounted on the outer extensions of said arms and biased against the clamping members to urge it toward the press, and means for closing the press to force the contoured mold faces together with the tensioned fabric therebetween, thereby shaping the fabric to the contour of the mold faces.

3. An apparatus for shaping a fabric comprising a press having opposing mold faces, clamping members hingedly attached to said press and having fabric clamping means thereon for clamping the edges of a fabric in the press, arms secured to the press and extending through and beyond the clamping members, said arms having enlarged outer ends engageable with the clamping members to limit outer movement thereof, coil springs mounted on said arms and biased between the press and clamping members to urge the clamping members outwardly to tension the clamped fabric, and means for closing said press to force the mold faces together with the tensioned fabric therebetween, thereby shaping the fabric to the contour of the mold faces.

4. An apparatus for shaping a fabric comprising a press having opposing mold faces, hinged members hingedly attached to said press for pivotal movement about axes substantially perpendicular to the plane of the mold faces, clamping members hingedly attached to said hinged members and having fabric clamping means thereon for clamping the edges of a fabric in the press, arms secured to the hinged members and extending through and beyond the clamping members, said arms having enlarged outer ends engageable with the clamping members to limit outer movement thereof, coil springs mounted on said arms and biased between the members to urge the clamping members outwardly to tension the clamped fabric, means for adjusting the position of the hinged members, thereby adjusting the direction of the tension applied to the fabric, and means for closing said press to force the mold faces together with the tensioned fabric therebetween, thereby shaping the fabric to the contour of the mold faces.

5. The apparatus for shaping a fabric as described in claim 4 and in which the means for adjusting the position of the hinged members comprises outer limit bolts threadably mounted on the press and extending substantially parallel therewith, said hinged members having concavely curved surfaces engageable with the ends of said outer limit bolts, inner limit bolts threadably mounted on said hinged members and extending substantially perpendicular thereto, said press having concavely curved surfaces engageable with the ends of said inner limit bolts, the position of the hinged members being adjusted by threadably adjusting said bolts and said hinged members being locked in place by advancing both bolts against the respective curved surfaces.

6. Apparatus for resiliently clamping an object comprising a support, a clamping member hingedly attached to said support and having clamping means thereon for attaching to an object, an arm secured to the support and extending through and beyond the clamping member, said arm having an enlarged portion engageable with the clamping member to limit outer movement thereof, a coil spring mounted on said arm and resiliently biasing the clamping member with respect to the support.

7. Apparatus for resiliently clamping an object comprising a support, an adjustable member pivotally attached to said support, means for adjusting the position of said adjustable member in relation to said support, a clamping member hingedly attached to said adjustable member and having clamping means thereon for attaching to an object, an arm secured to the adjustable member and extending through and beyond the clamping member, said arm having an enlarged portion engageable with the clamping member to limit outer movement thereof, a coil spring mounted on said arm and resiliently biasing the clamping member with respect to the adjustable member.

8. The apparatus for resiliently clamping an object as set out in claim 7 wherein the means for adjusting the position of the said adjustable member comprises an outer limit bolt threadably mounted on the support and extending substantially parallel therewith, said adjustable member having a concavely curved surface engageable with the end of said outer limit bolt to limit pivoting of the adjustable member away from said support, an inner limit bolt threadably mounted on said adjustable member and extending in the direction of the support, said support having a concavely curved surface engageable with the end of said inner limit bolt to limit pivoting of the adjusting member in the direction of the support, the adjustable member being locked in an adjusted position by advancing both bolts against the respective curved surfaces.

(References on following page)

References Cited in the file of this patent

UNITED STATES PATENTS

| | | |
|---|---|---|
| 294,046 | House | Feb. 6, 1884 |
| 626,300 | Rogers et al. | June 6, 1899 |
| 776,686 | Post | Dec. 6, 1904 |
| 2,266,846 | Buff | Dec. 23, 1941 |
| 2,417,586 | Crosley | Mar. 18, 1947 |
| 2,443,336 | Waldie | June 15, 1948 |
| 2,580,566 | MacHenry et al. | Jan. 1, 1952 |
| 2,759,217 | Peterson | Aug. 21, 1956 |
| 2,797,179 | Reynolds et al. | June 25, 1957 |
| 2,939,179 | Penman et al. | June 7, 1960 |
| 2,986,777 | Carter | June 6, 1961 |